US007011810B2

(12) United States Patent
Dakka et al.

(10) Patent No.: US 7,011,810 B2
(45) Date of Patent: Mar. 14, 2006

(54) CRYSTALLINE MOLECULAR SIEVES

(75) Inventors: Jihad Mohammed Dakka, Whitehouse Station, NJ (US); Machteld M. Mertens, Boortmeerbeek (BE); Daria Nowakiwska Lissy, Glen Mills, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/490,537

(22) PCT Filed: Sep. 27, 2002

(86) PCT No.: PCT/GB02/04355

§ 371 (c)(1),
(2), (4) Date: Sep. 8, 2004

(87) PCT Pub. No.: WO03/029144

PCT Pub. Date: Apr. 10, 2003

(65) Prior Publication Data

US 2005/0013774 A1  Jan. 20, 2005

(30) Foreign Application Priority Data

Sep. 28, 2001 (EP) ................................ 01308288

(51) Int. Cl.
*C01B 39/48* (2006.01)

(52) U.S. Cl. ...................... 423/708; 423/707; 423/709; 208/27; 208/110.01; 208/139; 208/213; 585/475; 585/481; 585/533; 585/418; 585/639

(58) Field of Classification Search ................ 423/707, 423/708, 709; 585/475, 481, 533, 418, 639; 208/110.01, 139, 27, 213
See application file for complete search history.

(56) References Cited

U.S. PATENT DOCUMENTS

| 4,873,067 A | 10/1989 | Valyocsik et al. ........... 423/279 |
| 4,973,781 A | 11/1990 | Valyocsik et al. ........... 585/467 |
| 5,603,821 A | 2/1997 | Jossens et al. ............. 208/111 |
| 5,785,947 A * | 7/1998 | Zones et al. ................ 423/705 |

FOREIGN PATENT DOCUMENTS

| EP | 0174121 A2 | 3/1986 |
| WO | 00/06494 | 7/1999 |

OTHER PUBLICATIONS

J.L. Schlenker et al.: "The Freamework Topolgy of ZSM-57: A New Syntheric Zeolite", Zeolites, Butterworth-Heinemann, US, vol. 10, No. 4, Apr. 1, 1990, pp. 293-296, XP000606295, ISSN: 0144-2449.

* cited by examiner

Primary Examiner—David Sample

(57) ABSTRACT

MFS structure type zeolite manufacture is facilitated by using a second organic molecule in addition to the usual hexaethylpentane diammonium salt.

30 Claims, No Drawings

CRYSTALLINE MOLECULAR SIEVES

CROSS-REFERENCE TO RELATED APPLICATIONS

This application is the U.S. National Stage of International Application No. PCT/GB02/04355, filed 27 Sep. 2002 which claims priority to European Patent Application No. 01308288.8, filed 28 Sep. 2001.

FIELD OF THE INVENTION

The present invention relates to a process for the preparation of a crystalline zeolite of the MFS structure type.

DESCRIPTION OF RELATED ART

Zeolites of the MFS structure type, and in particular ZSM-57, are useful catalyst components for a variety of conversion processes, such as hydrocarbon cracking, dehydrogenation, oligomerization, isomerization, disproportionation, and alkylation as well as the formation of hydrocarbons from oxygen-containing compounds such as alcohols and ethers.

The composition, properties and preparation of ZSM-57 are disclosed in EP-A-174 121, and U.S. Pat. Nos. 4,873,067 and 4,973,781, the entire disclosures of these documents being incorporated by reference herein. ZSM-57 is a zeolite with a typical molar ratio of $XO_2:Y_2O_3$ of at least 4, wherein X represents silicon and/or germanium and Y represents aluminium, boron, chromium, iron and/or gallium. Preferably, there are from greater than 8 to about 200 moles of $X_2$ per mole of $Y_2O_3$. Preferably, $XO_2$ is silica and $Y_2O_3$ is alumina.

ZSM-57 may be prepared as described in EP-A-174 121 from a synthesis mixture containing sources of alkali metal ions, an oxide of silicon, an oxide of aluminium, water and an organic directing agent which is a salt of N,N,N,N',N',N'-hexaethylpentane diammonium (HEPD, also known as hexaethyl-Diquat-5), and maintaining said mixture under crystallization conditions until the required zeolite is formed. The synthesis mixture has a composition within the following ranges: $SiO_2:Al_2O_3$ of 20 to 200:1, preferably 40 to 100:1; $H_2O:SiO_2$ of 10 to 200:1, preferably of 20 to 50:1; $OH^-:SiO_2$ of 0 to 3:1, preferably 0.1 to 0.5:1; $Z:SiO_2$ of 0 to 3:1, preferably of 0.1 to 2:1, where Z is an alkali metal cation; $R:SiO_2$ of 0.01 to 2:1, preferably of 0.1:1, where R is HEPD, preferably its dibromide salt. Crystallization of zeolite ZSM-57 may be carried out under either static or stirred conditions. A useful range of temperatures for crystallization is from 80° C. to 350° C. for a time of 12 hours to 200 days. Thereafter, the crystals are separated from the liquid and recovered. The synthesis of the zeolite crystals is said to be facilitated by the presence of at least 0.01 wt percent, preferably 0.10 wt %, and still more preferably 1 wt %, seed crystals (based on total weight) of crystalline product.

U.S. Pat. No. 4 873 067 further illustrates the preparation of boron, chromium, iron and/or gallium-containing zeolite ZSM-57 by a method comprising preparing a mixture containing sources of alkali metal ions, an oxide of silicon, an oxide of aluminium, a source of boron, chromium, iron and/or gallium, water and HEPD, and maintaining said mixture under crystallization conditions until the required zeolite is formed.

The methods described in these documents all use HEPD as organic directing agent (template).

This material is, however, expensive and not commercially available. Use of the material at the lower end of the range mentioned in EP-A-174 121 to minimize cost results in lower yields, while reducing the water content of the synthesis mixture increases synthesis times, thereby reducing batch yield.

SUMMARY OF THE INVENTION

We have now found that the preparation of crystalline molecular sieves, referred to for simplicity below as zeolites, of the MFS structure type is facilitated when a mixture of HEPD and an additional organic molecule is used as structure-directing agent.

Accordingly, the present invention provides a process for the manufacture of a crystalline molecular sieve of the MFS structure type, which comprises hydrothermal treatment of a synthesis mixture containing sources of alkali metal ions, of aluminium, and of silicon, water, an N,N,N,N',N',N'-hexaethylpentane diammonium salt (HEPD), hereinafter $R_1$, and $R_2$, an amine of formula $NR^1R^2R^3$ or a quaternary ammonium compound of formula $R^1R^2R^3R^4NX$, wherein $R^1$, $R^2$, $R^3$, or $R^4$, which may be identical or different, each independently represent a hydrogen atom, a linear alkyl group having from 1 to 8 carbon atoms, a branched alkyl group having from 3 to 8 carbon atoms, or a cycloalkyl group having 5 or 6 carbon atoms, at least one of $R^1$, $R^2$, $R^3$, and if present $R^4$, being other than hydrogen, and X represents an anion. Mixtures of two or more compounds $R_1$ may be used. Mixtures of two or more compounds $R_2$ may also be used. These may be mixtures of two or more amines, or of two or more quaternary compounds, or of one or more amines and one or more quaternary compounds.

DESCRIPTION OF THE INVENTION

The use of a mixture of HEPD, $R_1$, and of an additional organic molecule $R_2$ instead of $R_1$ alone facilitates the preparation of zeolites of the MFS structure type in several respects.

We have found that a synthesis mixture containing low amounts of $R_1$ can effectively produce zeolites of the MFS structure type when the additional organic molecule is present in the synthesis mixture. Its presence affords the MFS structure zeolite in higher yields than $R_1$ alone, even at low total organic molecule to silica ratios. Crystallization occurs faster, even under static conditions and in some cases without using seeds when the mixture of organic directing agents is used.

The invention also accordingly provides the use of the compound $R_2$ in the synthesis of an MFS structure type molecular sieve.

As amine for use as a second organic molecule there may be mentioned, for example, mono, di- and tri-methylamine, mono-, di- and triethylamine, mono-, di- and tri propylamines, mono-, di- and trihexylamines, mono-, di- and triheptylamines, mono-, di- and trioctylamines, cyclopentylamine and cyclohexylamine. Advantageously, the amine is a triamine, i.e., none of $R^1$, $R^2$, and $R^3$ represents hydrogen. Preferably, the amine of formula $NR^1R^2R^3$ is selected from trimethylamine, triethylamine and a tripropylamine; most preferably it is triethylamine. Advantageously, the quaternary ammonium compound corresponds to one of the above amines, and is preferably a tetralkylammonium compound, preferably a tetramethyl-, tetraethyl-, or tetrapropyl-ammonium compound, a tetra ethylammonium compound being most preferred. As examples of the anion there may be mentioned halide, especially chloride or bromide, and hydroxide. Mixtures of these compounds may be used, as indicated above.

The invention more especially provides a process for the manufacture of a crystalline molecular sieve of the MFS structure type which comprises subjecting to hydrothermal treatment a synthesis mixture having a composition within the molar ranges of

| | |
|---|---|
| 20 to 200 | $SiO_2:Al_2O_3$ |
| 10 to 200 | $H_2O:SiO_2$ |
| 0 to 3 | $OH^-:SiO_2$ |
| 0 to 3 | $M^+:SiO_2$ |
| 0.01 to 2 | $R_1:SiO_2$ |
| 0.005 to 2 | $R_2:SiO_2$ | wherein $M^+$ represents an alkali metal, $R_1$ represents HEPD, and $R_2$ the additional organic molecule defined above.

Preferred molar ranges are

| | |
|---|---|
| 40 to 100 | $SiO_2:Al_2O_3$ |
| 15 to 50 | $H_2O:SiO_2$ |
| 0.1 to 0.5 | $OH^-:SiO_2$ |
| 0.1 to 2 | $M^+:SiO_2$ |
| 0.01 to 1 | $R_1:SiO_2$ |
| 0.0075 to 2 | $R_2:SiO_2$ |

More preferably, the molar ratio of $R_1:SiO_2$ is within the range 0.01 to 1:1 and the molar ratio of $R_2:SiO_2$ is within the range of from 0.01 to 2:1. Most preferably the molar ratios of $R_1:SiO_2$ and $R_2:SiO_2$ are both within the range of from 0.02 to 1:1.

Advantageously the $R_1+R_2:SiO_2$ molar ratio is at least 0.025:1, and preferably within the range 0.025:1 to 10:1, more preferably 0.025:1 to 5:1, and most preferably within the range of 0.025 to 3:1. Preferred mixtures are of the HEPD dibromide and triethylamine or tetraethylammonium bromide or hydroxide, and preferred ratios are within the range 1:3 to 1:1.

The hydrothermal treatment may be carried out under the usual ZSM synthesis conditions. Advantageously used are temperatures within the range of from 100° C. to 200° C., preferably from 140° C. to 180° C., and conveniently at about 160° C. Temperature may be increased, gradually or stepwise, during treatment. Advantageously, a time within the range of from 70 to 200 hours, preferably within the range of from 70 to 150 hours, and conveniently from 3 to 8 days, is employed, lower temperatures corresponding to longer times.

Treatment may be carried out with or without agitation, for example stirring or tumbling (rotating the vessel about a horizontal axis).

It has been found that for certain synthesis mixture compositions, a pure MFS structure type material is more readily obtained when synthesis is carried out with agitation. For a composition that gives pure material whether synthesis is carried out with or without agitation, crystal size is normally greater if the synthesis is carried out without agitation.

The synthesis may be aided by seeds from a previous synthesis, the seeds being advantageously colloidal or near-colloidal. Seeds of a different structure type, especially LEV, may be used. The preparation of colloidal LEV seeds is described in International application WO 00/06494. Seeds are advantageously present in a proportion of from 0.001% to 1%, preferably 0.01% to 0.1%, by weight, based on the total weight of synthesis mixture. For certain synthesis mixtures, a pure MFS structure type material is more readily obtained with seeding.

The procedure may include an ageing period, either at room temperature or at a moderately elevated temperature, lower than that used for the hydrothermal treatment.

The sources of the various elements required in the final product may be any of those in commercial use or described in the literature, as may the method of preparation of the synthesis mixture.

For example, the source of silicon may be a silicate, e.g., an alkali metal silicate, a tetraalkyl orthosilicate, or, a high surface area silica, for example one sold by Degussa under the trade names Aerosil or Ultrasil, or preferably, an aqueous colloidal suspension of silica, for example one sold by E.I. du Pont de Nemours under the trade name Ludox.

The source of aluminium is preferably aluminium sulphate or hydrated alumina. Other aluminium sources include, for example, other water-soluble aluminium salts, sodium aluminate, or an alkoxide, e.g., aluminium isopropoxide, or aluminium metal, e.g., in the form of chips.

The alkali metal is advantageously potassium or sodium, the sodium source advantageously being sodium hydroxide or sodium aluminate.

The organic molecules are advantageously supplied in the form of an aqueous solution.

The direct product of the synthesis described above may be calcined, cation-exchanged, and otherwise treated as is known in the art. Alkali metal cations in the as-prepared or calcined form may be removed, for example by treatment with concentrated acids, e.g., HCl, or with a fugitive base, e.g., an ammonium compound, to provide the material in its hydrogen form.

The products of the invention, if required after cation exchange and/or calcining, have utility as catalyst precursors, catalysts, and separation and absorption media. They are especially useful in numerous organic, e.g., hydrocarbon, compound conversions, separations and absorptions. They may be used alone, or in admixture with other molecular sieves, in particulate form, supported or unsupported, or in the form of a supported layer. Hydrocarbon conversions include, for example, cracking, reforming, hydrofining, aromatization, oligomerization (e.g., di- and trimerization, especially of olefins having 3 to 6 carbon atoms, more especially butene trimerization), isomerization, dewaxing, and hydrocracking (e.g., naphtha to light olefins, higher to lower molecular weight hydrocarbons, alkylation, transalkylation, disproportionation or isomerization of aromatics). Other conversions include the reaction of alcohols with olefins and the conversion of oxygenates to hydrocarbons.

EXAMPLES

The following numbered examples, in which all parts are percentages are by weight unless otherwise indicated, illustrate the invention. Percentage yields are based on the total weight of synthesis mixture.

To form HEPD, the following procedure was used: 1 mole of 1,5-dibromopentane and 2 moles of triethylamine were dissolved in ethanol and refluxed overnight. The resulting solution was concentrated and finally evaporated to dryness under vacuum at 35° C. The white product was recrystallized from ether and identified as N,N,N,N',N',N'-hexaethylpentane diammonium dibromide.

Examples A and B—Comparative 150.02 parts of colloidal silica (Ludox HS40) and 400.21 parts of water were formed into an initial mixture (A) with stirring. 43.41 parts of N,N,N,N',N',N' hexaethylpentane diammonium dibromide (hereinafter "HEPD" or $R_1$) were dissolved in 97.36 parts of water and added to mixture (A), together with 11.53 parts of rinse water, and mixed for 5 minutes. A solution of 11.14 parts of $Al_2(SO_4)_3 \cdot 18H_2O$ and 16.25 parts NaOH (Baker, 98.6%) in 99.97 parts of water, followed by 12.10 parts of rinse water, was added and mixed for a further 5 minutes to form a smooth gel with a molar composition of:
$2Na_2O:R_1:0.17\ Al_2O_3:10\ SiO_2:400\ H_2O$

Example A

The synthesis mixture was poured into a stainless steel autoclave equipped with a stirrer and heated with stirring over the course of 6 hours to 160° C., and maintained at that temperature with stirring for 144 hours. The solid product was recovered from the reaction mixture, washed, and dried at 120° C. Yield 6.7%. XRD analysis of the material showed it to be ZSM-57, a zeolite of the MFS structure type.

Example B

A similar synthesis mixture was heated for 240 hours at 160° C. without stirring. No pure material was obtained, instead a mixture of MOR and MFS structure type materials and quartz resulted.

Example 1

A synthesis mixture was prepared as described in Comparative Example A, except that the proportion of HEPD used was reduced to 0.25 moles per 10 moles $SiO_2$, and 0.25 moles of triethylamine (TEA) per 10 moles $SiO_2$ were added to the synthesis mixture as prepared in Example A. The molar composition of the gel was:
$1.81\ Na_2O:0.25\ HEPD:0.25\ TEA:0.17\ Al_2O_3:10\ SiO_2:401\ H_2O$ The synthesis mixture was poured into an autoclave and heated to 160° C. over the course of 2 hours, and maintained at that temperature for 96 hours, without agitation. A solid product was recovered, washed, and dried at 120° C.

XRD analysis of the material showed it to be pure ZSM-57, the yield was 6.55%.

Examples 2 and 3

In these examples, small proportions of LEV seeds were added to the synthesis mixture.

In Example 2, the synthesis mixture was prepared as in Example 1, but using 0.75 moles of TEA per 10 moles $SiO_2$, and then 205 ppm LEV seeds, based on the total weight of mixture, were added, with shaking for 10 minutes. Molar composition of gel:
$1.80\ Na_2O:0.25\ HEPD:0.75\ TEA:0.17\ Al_2O_3:10\ SiO_2:400\ H_2O$, with 205 wt ppm LEV seeds.

In Example 3, a synthesis mixture was prepared as in Example 2, but using 200 moles $H_2O$ per 10 $SiO_2$, and 201 ppm LEV seeds. Molar composition of gel:
$1.80\ Na_2O:0.25\ HEPD:0.75\ TEA:0.17\ Al_2O_3:10\ SiO_2:200\ H_2O$, with 201 ppm LEV seeds.

Both synthesis mixtures were heated to 160° C. over the course of 2 hours, without stirring. In Example 2, the 160° C. temperature was maintained for 96 hours, and in Example 3 for 144 hours, both without agitation. Both Examples gave ZSM-57, Example 2 in 6.63% yield, Example 3 in 11.47% yield.

Examples 4 and 5

These examples employ synthesis mixtures that contain 0.25 moles of tetraethylammonium hydroxide (TEAOH) and 0.25 moles of HEPD per 10 moles $SiO_2$, in a more concentrated synthesis mixture than that of Example 1 (200 moles of $H_2O$ per 10 $SiO_2$), with LEV seeds added.

A synthesis mixture was prepared having the molar composition:
$1.90\ Na_2O:0.25\ HEPD:0.25\ TEAOH:0.17\ Al_2O_3:10\ SiO_2:201\ H_2O$ with 201 ppm LEV seeds.

The mixture was divided into two portions, each being heated to 160° C. over 6 hours and maintained at that temperature for 120 hours. One portion, Example 4, was not agitated, the other, Example 5, was tumbled at 120 rpm throughout.

The solid products of both procedures were recovered, washed and dried overnight at 120° C. XRD analysis showed both were ZSM-57. Yields: Example 4: 10.88%, Example 5: 9.57%.

In comparison experiments (Examples C and D), an unseeded synthesis mixture otherwise of the same molar composition was subjected to hydrothermal treatment at the same temperature. The static portion, Example C, showed little crystallinity after 192 hours, while the tumbled portion, Example D, had yielded only a mixture of mordenite and α-quartz after 192 hours.

Example 6

This example employs a synthesis mixture containing 0.25 moles of tetraethylammonium bromide (TEABr) and 0.25 moles of HEPD per 10 moles $SiO_2$, without seeding.

A synthesis mixture was prepared having the molar composition:
$2.00\ Na_2O:0.25\ HEPD:0.25\ TEABr:0.17\ Al_2O_3:10\ SiO_2:400.1\ H_2O$ The mixture was aged at room temperature for 24 hours, heated over 6 hours to 160° C., maintained at that temperature for 96 hours, cooled to room temperature and aged for a further 24 hours, with stirring throughout. The resulting mixture was centrifuged, the solids washed, and dried overnight at 120° C. The product was pure ZSM-57, yield 6.4%.

Example 7

This example employs the same organic constituents as the previous example, and a different silica source, a high purity silica solid by Degussa under the trade name Ultrasil VN3SP-PM.

A synthesis mixture was prepared having the molar composition:
$1.96\ Na_2O:0.25\ HEPD:0.25\ TEABr:0.17\ Al_2O_3:10\ SiO_2:202\ H_2O$, with 198 ppm LEV seeds.

The mixture was heated over 2 hours to 160° C., and maintained at that temperature for 96 hours, all without stirring. The resulting mixture was centrifuged, the solids washed, and dried overnight at 120° C. The product was pure ZSM-57, yield 11.6%.

Example 8

A synthesis mixture was prepared having the molar composition:
1.90 $Na_2O$:0.25 HEPD:0.25 TEAOH:0.17 $Al_2O_3$:10 $SiO_2$: 202 $H_2O$ and 202 ppm LEV seeds.

The mixture was heated over 6 hours to 160° C., and maintained at that temperature for 130 hours, all with stirring. The resulting mixture was centrifuged, and the solids washed and dried for 60 hours at 120°. The product was pure ZSM-57, yield 9.28%.

In a comparison experiment (Example E), the molar proportion of TEAOH was doubled, to 0.50 per 10 $SiO_2$; the product was MFS in admixture with MOR and α-crystobalite.

Example 9

In this example, the same molar proportion of TEAOH, 0.50 per 10 $SiO_2$, as in Comparison Example E was used, but compensated by a lower molar proportion of $Na_2O$, 1.40 per 10 $SiO_2$.

A synthesis mixture was prepared having the molar composition:
1.40 $Na_2O$:0.25 HEPD:0.50 TEAOH:0.17 $Al_2O_3$:10 $SiO_2$: 200 $H_2O$ and 200 ppm LEV seeds.

The mixture was heated over 6 hours to 160° C. and maintained at that temperature for 120 hours, all with stirring. The resulting mixture was centrifuged, the solids washed and dried overnight at 120° C. The product was pure ZSM-57, of particle size about 1 μm, yield 12.5%.

We claim:

1. A process for the manufacture of a crystalline molecular sieve of the MFS structure type, the process comprising hydrothermal treatment of a synthesis mixture containing:
   a) sources of alkali metal ions, aluminium, and silicon;
   b) water;
   c) $R_1$, an N,N,N,N',N',N'-hexaethylpentane diammonium salt; and
   d) $R_2$, an amine of formula $NR^1R^2R^3$ or a quaternary ammonium compound of formula $R^1R^2R^3R^4NX$;
   wherein:
   i) $R^1$, $R^2$, $R^3$, and $R^4$, which may be identical or different, each independently represents:
      1) a hydrogen atom,
      2) a linear alkyl group having from 1 to 8 carbon atoms,
      3) a branched alkyl group having from 3 to 8 carbon atoms, or
      4) a cycloalkyl group having 5 or 6 carbon atoms,
   ii) at least one of $R^1$, $R^2$, and $R^3$, and if present $R^4$, being other than hydrogen, and
   iii) X represents an anion.

2. The process as claimed in claim 1, wherein none of $R^1$, $R^2$, $R^3$, and $R^4$ is hydrogen.

3. The process as claimed in claim 1, wherein the amine comprises one or more of trimethylamine, triethylamine, and tripropylamine.

4. The process as claimed in claim 1, wherein the quaternary ammonium compound comprises one or more of tetraethylammonium halide, and tetraethylammonium hydroxide.

5. The process as claimed in claim 4, wherein the halide comprises one or more of bromide and chloride.

6. The process as claimed in claim 1, wherein:
   a) the synthesis mixture has a composition within the molar ranges of:

| | |
|---|---|
| 20 to 200 | $SiO_2$:$Al_2O_3$ |
| 10 to 200 | $H_2O$:$SiO_2$ |
| 0 to 3 | $OH^-$:$SiO_2$ |
| 0 to 3 | $M^+$:$SiO_2$ |
| 0.01 to 2 | $R_1$:$SiO_2$ |
| 0.005 to 2 | $R_2$:$SiO_2$ | and
b) $M^+$ represents an alkali metal cation.

7. The process as claimed in claim 6, wherein the synthesis mixture has a composition within the molar ranges of:

| | |
|---|---|
| 40 to 100 | $SiO_2$:$Al_2O_3$ |
| 15 to 50 | $H_2O$:$SiO_2$ |
| 0.1 to 0.5 | $OH^-$:$SiO_2$ |
| 0.1 to 2 | $M^+$:$SiO_2$ |
| 0.01 to 1 | $R_1$:$SiO_2$ |
| 0.0075 to 2 | $R_2$:$SiO_2$ |

8. The process as claimed in claim 6, wherein the molar ratio of $R_1$:$SiO_2$ is within the range of from 0.01 to 1:1 and the molar ratio of $R_2$:$SiO_2$ is within the range of from 0.01 to 2:1.

9. The process as claimed in claim 6, wherein the molar ratios of $R_1$:$SiO_2$ are within the range of from 0.02 to 1:1.

10. A process as claimed in claim 6, wherein the molar ratio of $(R_1+R_2)$:$SiO_2$ is within the range of 0.025 to 3:1.

11. The process as claimed in claim 1, wherein the silicon source is colloidal silica, the aluminium source is aluminium sulphate, and the alkali metal source is sodium hydroxide.

12. The process as claimed in claim 1, wherein the synthesis mixture also contains seed crystals.

13. The process as claimed in claim 12, wherein the seed crystals are of LEV structure type.

14. The process as claimed in claim 12, wherein the proportion of seeds is within the range of 0.001% to 1% by weight, based on the weight of synthesis mixture.

15. The process as claimed in claim 1, carried out at a temperature within the range 100° C. to 200° C.

16. The process as claimed in claim 1, carried out for from 70 to 200 hours.

17. The process as claimed in claim 1, carried out under static conditions.

18. The process as claimed in claim 1, carried out under agitated conditions.

19. The process as claimed in claim 1, wherein the crystalline molecular sieve produced is ZSM-57.

20. A crystalline molecular sieve of the MFS structure type, containing $R_1$ and $R_2$, wherein:
   a) $R_1$ is an N,N,N,N',N',N'-hexaethylpentane diammonium salt;
   b) $R_2$, an amine of formula $NR^1R^2R^3$ or a quaternary ammonium compound of formula $R^1R^2R^3R^4NX$, wherein:
   i) $R^1$, $R^2$, $R^3$, and $R^4$, which may be identical or different, each independently represents:
      1) a hydrogen atom,
      2) a linear alkyl group having from 1 to 8 carbon atoms,
      3) a branched alkyl group having from 3 to 8 carbon atoms, or
      4) a cycloalkyl group having 5 or 6 carbon atoms, and at least one of $R^1$, $R^2$, and $R^3$, and if present $R^4$, being other than hydrogen, and
   ii) X represents an anion.

21. The crystalline molecular sieve as claimed in claim 20, wherein component $R_2$ is selected from one or more of a trimethylamine, a triethylamine, a tripropylamine, a tetraethylammonium salt, and a tetraethylammonium hydroxide.

22. The crystalline molecular sieve as claimed in claim 20, which is ZSM-57 contains residual $R_1$ and $R_2$.

23. The crystalline molecular sieve as claimed in claim 20, which has been subjected to calcination and/or ion exchange.

24. A method of hydrocarbon conversion, the method comprising contacting the hydrocarbon and a crystalline molecular sieve of the MFS structure type, under conditions sufficient to effect conversion of the hydrocarbon, wherein the crystalline molecular sieve of the MFS structure type contains:
   a) $R_1$, an N,N,N,N',N',N'-hexaethylpentane diammonium salt; and
   b) $R_2$, an amine of formula $NR^1R^2R^3$ or a quaternary ammonium compound of formula $R^1R^2R^3R^4NX$; wherein:
      i) $R^1$, $R^2$, $R^3$, and $R^4$, which may be identical or different, each independently represents:
         1) a hydrogen atom,
         2) a linear alkyl group having from 1 to 8 carbon atoms,
         3) a branched alkyl group having from 3 to 8 carbon atoms, or
         4) a cycloalkyl group having 5 or 6 carbon atoms, and
      ii) at least one of $R^1$, $R^2$, and $R^3$, and if present $R^4$, being other than hydrogen, and
      iii) X represents an anion.

25. The method of claim 24 wherein the hydrocarbon conversion is selected from cracking, reforming, hydrofining, aromatization, oligomerization, isomerization, dewaxing and hydrocracking.

26. The method of claim 25, wherein the oligomerization is selected from dimerization and trimerization of olefins having 3 to 6 carbon atoms.

27. The method of claim 26, wherein the oligomerization is trimerization of butene.

28. The method of claim 25, wherein the hydrocracking is selected from:
   (1) naphtha to light olefins,
   (2) higher to lower molecular weight hydrocarbons,
   (3) alkylation of aromatics,
   (4) transalkylation of aromatics,
   (5) disproportionation of aromatics, and
   (6) isomerization of aromatics.

29. A method of reacting an alcohol and and an olefin, the method comprising contacting the alcohol and olefin and a crystalline molecular sieve of the MFS structure type, under conditions sufficient to effect the reaction of the alcohol and the olefin, wherein the crystalline molecular sieve of the MFS structure type contains:
   a) $R_1$, an N,N,N,N',N',N'-hexaethylpentane diammonium salt; and
   b) $R_2$, an amine of formula $NR^1R^2R^3$ or a quaternary ammonium compound of formula $R^1R^2R^3R^4NX$; wherein:
      i) $R^1$, $R^2$, $R^3$, and $R^4$, which may be identical or different, each independently represents:
         1) a hydrogen atom,
         2) a linear alkyl group having from 1 to 8 carbon atoms,
         3) a branched alkyl group having from 3 to 8 carbon atoms, or
         4) a cycloalkyl group having 5 or 6 carbon atoms, and
      ii) at least one of $R^1$, $R^2$, and $R^3$, and if present $R^4$, being other than hydrogen, and
      iii) X represents an anion.

30. A method of converting an oxygenate to a hydrocarbon, the method comprising contacting the oxygenate and a crystalline molecular sieve of the MFS structure type, under conditions sufficient to effect conversion of the oxygenate, wherein the crystalline molecular sieve of the MFS structure type contains:
   a) $R_1$, an N,N,N,N',N',N'-hexaethylpentane diammonium salt; and
   b) $R_2$, an amine of formula $NR^1R^2R^3$ or a quaternary ammonium compound of formula $R^1R^2R^3R^4NX$;
      i) wherein $R^1$, $R^2$, $R^3$, and $R^4$, which may be identical or different, each independently represents:
         1) a hydrogen atom,
         2) a linear alkyl group having from 1 to 8 carbon atoms,
         3) a branched alkyl group having from 3 to 8 carbon atoms, or
         4) a cycloalkyl group having 5 or 6 carbon atoms, and
      ii) at least one of $R^1$, $R^2$, and $R^3$, and if present $R^4$, being other than hydrogen, and
      iii) X represents an anion.

\* \* \* \* \*